US009331596B2

(12) United States Patent
Ganev et al.

(10) Patent No.: US 9,331,596 B2
(45) Date of Patent: May 3, 2016

(54) COMPOSITE AC-TO-DC POWER CONVERTER WITH BOOSTING CAPABILITIES USING T CONFIGURATION

(71) Applicant: HONEYWELL INTERNATIONAL, INC., Morristown, NJ (US)

(72) Inventors: Evgeni Ganev, Torrance, CA (US); William Warr, Glendale, CA (US); Keming Chen, Torrance, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 300 days.

(21) Appl. No.: 13/894,888

(22) Filed: May 15, 2013

(65) Prior Publication Data
US 2014/0340950 A1 Nov. 20, 2014

(51) Int. Cl.
*H02M 7/04* (2006.01)
*H02M 7/10* (2006.01)

(52) U.S. Cl.
CPC . *H02M 7/04* (2013.01); *H02M 7/10* (2013.01)

(58) Field of Classification Search
CPC .................................. H02M 5/14; H02M 7/04
USPC .......... 363/148, 149, 152, 153, 154, 155, 156
See application file for complete search history.

(56) References Cited

U.S. PATENT DOCUMENTS

| | | | | |
|---|---|---|---|---|
| 2,895,099 | A * | 7/1959 | Dortort | 363/53 |
| 5,781,428 | A * | 7/1998 | Paice | 363/126 |
| 6,014,323 | A * | 1/2000 | Aiello et al. | 363/71 |
| 6,058,031 | A * | 5/2000 | Lyons et al. | 363/67 |
| 6,169,674 | B1 * | 1/2001 | Owen | 363/64 |
| 6,229,722 | B1 * | 5/2001 | Ichikawa et al. | 363/71 |
| 6,498,736 | B1 * | 12/2002 | Kamath | 363/44 |
| 7,148,661 | B2 * | 12/2006 | Trainer | H02M 7/10 363/68 |
| 7,375,996 | B2 | 5/2008 | Singh et al. | |
| 2008/0205101 | A1 | 8/2008 | Kleinecke et al. | |

FOREIGN PATENT DOCUMENTS

| | | | |
|---|---|---|---|
| EP | 0913918 | A2 | 5/1999 |
| EP | 1528664 | A2 | 5/2005 |

(Continued)

OTHER PUBLICATIONS

"18-pulse Drives and Voltage Unbalance," Hink, K.M, MTE Corporation Technical Articles, 2008.*

(Continued)

*Primary Examiner* — Fred E Finch, III
*Assistant Examiner* — Jye-Jun Lee
(74) *Attorney, Agent, or Firm* — Shimokaji IP

(57) ABSTRACT

A boosting AC-to-DC converter An AC-to-DC converter may include a main rectifier, a first auxiliary rectifier, a second auxiliary rectifiers and a transformer assembly. The transformer assembly may include a set of primary windings arranged in a first multiphase configuration and connected to the main rectifier, a first set of secondary windings arranged in a second multiphase relationship and connected to the first auxiliary rectifier and a second set of secondary windings arranged in a third multiphase configuration and connected to the second auxiliary rectifier. The second multiphase configuration of the first set of secondary windings and the third multiphase configuration of the second set of secondary windings may be in phase shifting relationships relative to the first multiphase configuration of the set of primary windings.

5 Claims, 5 Drawing Sheets

(56) References Cited

FOREIGN PATENT DOCUMENTS

| JP | H11122943 A | 4/1999 | |
|---|---|---|---|
| WO | WO 2012129980 A1 * | 10/2012 | .............. H02M 7/06 |

OTHER PUBLICATIONS

"Three Phase Transformer Winding Configurations and Differential Relay Compensation," Larry Lawhead, Randy Hamilton, John Horak, Basler Electric Company, Presented before the 60th Annual Georgia Tech Protective Relay Conference, May 2-5, 2006.*

Examination Report dated Oct. 30, 2014 received in EP Application No. 14166276.7.

Search Report dated Oct. 6, 2014 received in EP Application No. 14166276.7.

A Novel T-Connected Autotransformer-Based 18-Pulse AC-DC Converter for Harmonic Mitigation in Adjustable-Speed Induction-Motor Drives Author (s): Bhim Singh, Vipin Garg, and G. Bhuvaneswari Author (s) affiliation: Indian Inst. of Technol., New Delhi.

High current AC/DC power converters using T-connected Transformers Author (s): Guimaraes, C. Publication: Electrical and Computer Engineering, 1995. Canadian Conference on Sep. 5-8, 1995.

Simulation of Multipulse AC-DC Converters for Medium Voltage ASD's Author (s): Praveen Srivastava and Sanjiv Kr. Publication: VSRD-IJEECE, vol. 1 (10), 2011, 542-554.

* cited by examiner

COMPOSITE AC-TO-DC POWER CONVERTER WITH BOOSTING CAPABILITIES USING T CONFIGURATION

BACKGROUND OF THE INVENTION

The present invention generally relates to AC-to-DC converters and more particularly to passive AC-to-DC converters with voltage boosting capability.

AC-to-DC converters play a significant role in the modern aerospace/military industry. This is particularly true in the area of more electric architecture (MEA) for aircraft and spacecraft. Power quality is a major concern for MEA aircraft because of the large number of electric power systems and equipment installed on the same bus. The power quality of these systems and equipment has stringent requirements to ensure that all power supplies/utilization equipment function together properly.

The term "composite AC-to-DC converter" has been coined to distinguish a converter using two or more conversion methods in parallel. The concept for a composite AC-to-DC converter originated as a further improvement towards smaller size, lower weight, and higher efficiency.

While composite AC-to-DC converters present a large step toward performance improvement they have not incorporated efficient boosting capabilities. They typically provide rectification of a three phase 115-V AC system resulting in a typical output voltage value of 270 V DC. There are many applications where the output voltage is desired to be much higher for a better performance of a consecutive power conditioning. Typical values used in some power distribution systems are 540 V DC, +/−270 Vdc and 610 V DC. That means that it would be desirable for a composite AC-to-DC converter, used in a three phase 115-V AC system, to produce output voltage about two times higher at its rectified output. In other words, it would be desirable to provide voltage boosting capability in a composite AC-to-DC converter. Additionally, it would be desirable to achieve such voltage boosting passively while introducing only minimal harmonic distortions to input AC currents.

Typically, lower frequency harmonic distortions may be reduced by employing AC-to-DC converters with high pulse configurations. For example, when conversion of three phase AC power is performed with a 24-pulse converter, harmonic distortions of input power may be maintained at a reasonably low level. Of course, a 24-pulse converter must have a higher number of transformer windings than a 12-pulse or 18-pulse converter. Consequently, 24-pulse converters are typically heavier, larger and more expensive than 12-pulse or 18-pulse converters. Such sizes and weights may be evaluated objectively by considering and expression W/VA: where W is DC power in watts; and VA is the rating of a transformer expressed in volt-amperes. For a typical 18-pulse converter with a 1:2 boosting capability, W/VA may be about 0.5.

As can be seen, there is a need for a small and light weight voltage-boosting AC-to-DC converter which produces only minimal harmonic distortions of input current and voltage. More particularly, there is a need for a 12-pulse or 18-pulse converter that may produce voltage boosting with only minimal production of low frequency harmonic distortion of input AC current and voltage.

SUMMARY OF THE INVENTION

In one aspect of the present invention, an AC-to-DC converter may comprise: a main rectifier; a first auxiliary rectifier; a second auxiliary rectifier; and a transformer assembly including: a set of primary windings arranged in a first multiphase configuration and connected to the main rectifier; a first set of secondary windings arranged in a second multiphase relationship and connected to the first auxiliary rectifier; and a second set of secondary windings arranged in a third multiphase configuration and connected to the second auxiliary rectifier, wherein the second multiphase configuration of the first set of secondary windings and the third multiphase configuration of the second set of secondary windings are in phase shifting relationships relative to the first multiphase configuration of the set of primary windings so that AC power emerging from the first and the second set of secondary windings is phase shifted relative to AC power applied to the primary windings.

In another aspect of the present invention, A non-symmetrical AC-to-DC converter may comprise: a main rectifier; a first auxiliary rectifier; a second auxiliary rectifiers; and a transformer assembly including: a set of primary windings arranged in a first multiphase configuration and connected to the main rectifier; a first set of secondary windings arranged in a second multiphase relationship and connected to the first auxiliary rectifier; and a second set of secondary windings arranged in a third multiphase configuration and connected to the second auxiliary rectifier; wherein the second multiphase configuration of the first set of secondary windings and the third multiphase configuration of the second set of secondary windings are in phase shifting relationships relative to the first multiphase configuration of the set of primary windings so that AC power emerging from the first and the second set of secondary winding is phase shifted relative to AC power applied to the primary windings; and wherein the second multiphase configuration of the first set of secondary windings differs from the third multiphase configuration of the second set of secondary windings.

In still another aspect of the invention, a method for performing three phase AC-to-DC power conversion with a voltage boost may comprise the steps of: passing a first portion of AC power directly to a main rectifier at a first voltage; rectifying the first portion of AC power in the main rectifier; applying AC power to primary windings of a transformer at the first voltage; inductively transferring a second portion of AC power from the primary windings to a first set of secondary windings of the transformer while introducing a phase shift of the second portion of AC power relative to the first portion of AC power; rectifying the second portion of AC power in a first auxiliary rectifier; inductively transferring a third portion of AC power from the primary windings to a second set of secondary windings of the transformer while introducing a phase shift of the third portion of AC power relative to the first portion of AC power; rectifying the third portion of AC power in a second auxiliary rectifier; and combining outputs of the main and auxiliary rectifiers through a series connection so that output voltage of the main and auxiliary rectifiers are added together to produce a single rectified DC output.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide passive composite AC-to-DC converters with voltage boosting capability. More particularly, phase shifting may occur between power applied to a main rectifier and power applied to auxiliary rectifiers. Such converters may produce only minimal low frequency harmonic distortion of input AC current and voltage.

Figure 1:
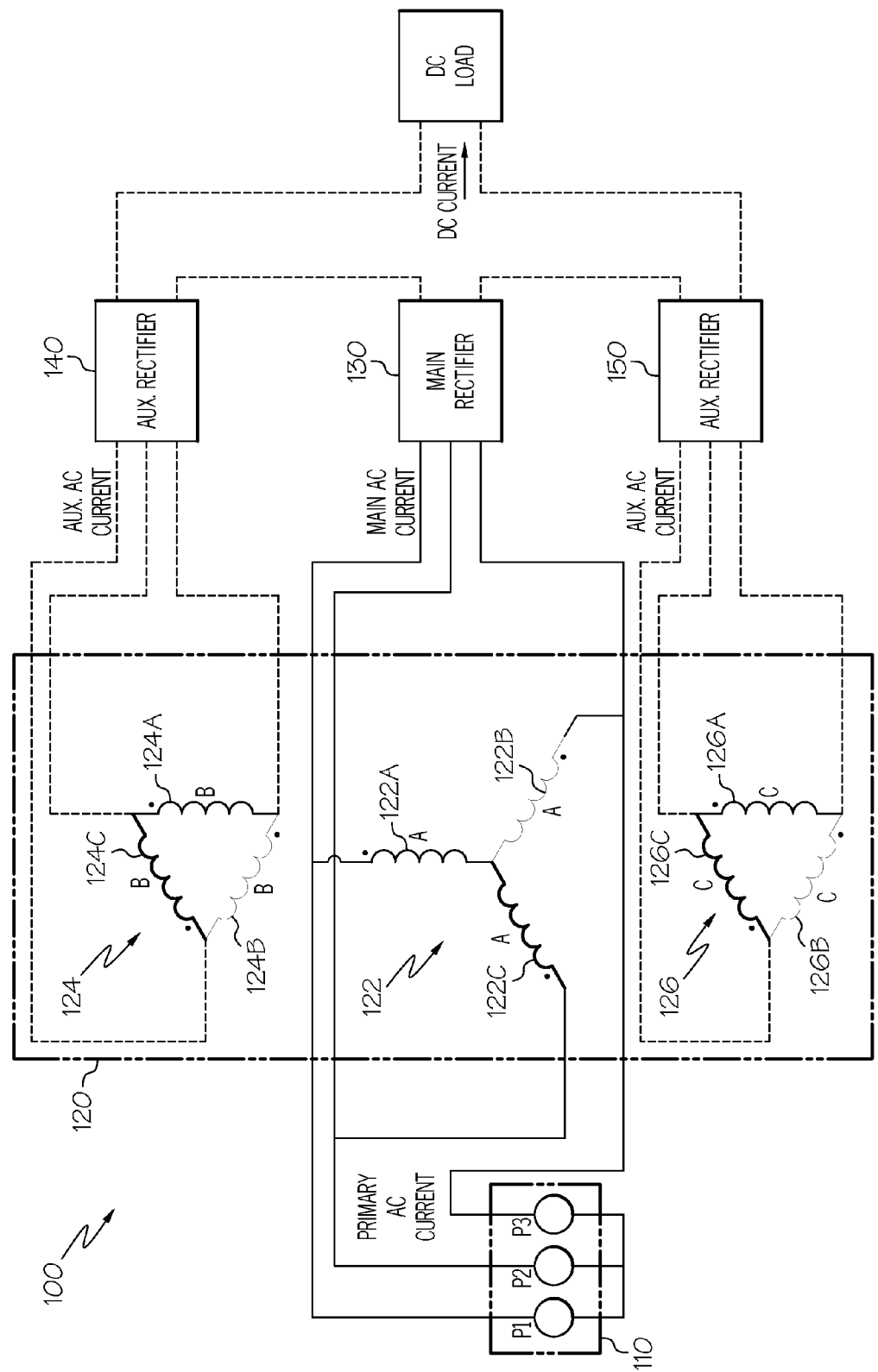
FIG. 1 is a schematic diagram of an AC-to-DC power converter in accordance with an embodiment of the invention.

Referring now to FIG. 1, it may be seen that an exemplary AC-to-DC converter 100 may include an AC power source 110, a transformer assembly 120, a main rectifier 130, a first auxiliary rectifier 140 and a second auxiliary rectifier 150. The transformer assembly 120 may include a set of primary windings designated generally by the numeral 122 and two sets of secondary windings designated generally by the numerals 124 and 126. The set of primary windings 122 are specifically designated as winding 122A, winding 122B and winding 122C. The set of secondary windings 124 are specifically designated as winding 124A, winding 124B and winding 124C. Another set of secondary windings 126 are designated specifically as winding 126A, winding 126B and winding 126C.

The primary windings 122A, 122B and 122C may be connected directly to the AC power source 110 and also to the main rectifier 130. The secondary windings 124A and 126A may be inductively coupled to the primary winding 122A. Similarly, the secondary windings 124B and 126B may be inductively coupled to the primary winding 122B and the secondary windings 124C and 126C may be inductively coupled to the primary winding 122C. In the exemplary embodiment of the converter 100, the set of primary windings 122 may be interconnected in a WYE configuration, the set of secondary windings 124 may be interconnected with one another in a DELTA configuration, and the set of secondary windings 126 may be interconnected with one another in a DELTA configuration. In that regard, the set of secondary windings 124 and the set of secondary windings 126 may be in phase shifting relationships relative to the set 122 of primary windings.

AC power from the power source emerging from the set of secondary windings 124 may experience a phase shift relative to AC power entering the primary windings 122. Similarly, AC power emerging from the set of secondary windings 126 may experience a phase shift relative to AC power emerging from the set of primary windings 122, with an attendant significant reduction in low-end harmonic distortion of input power.

The auxiliary rectifiers 140 and 150 may be connected in series to one another and to the main rectifier 130. Thus output voltages of the auxiliary rectifiers 140 and 150 and the main rectifier 130 may be stacked to provide voltage boosting. In the particular arrangement of the converter 100, the converter may function in a 12 pulse mode with a converter boost ratio of about 1.0:2.0 (input to output). A W/VA ratio of about 0.887 may be attained as compared to prior art converters that may have W/VA ratio of about 0.5. Such an improvement in W/VA ratio may translate to a size and/or weight reduction of about 43.6%.

Figure 2:
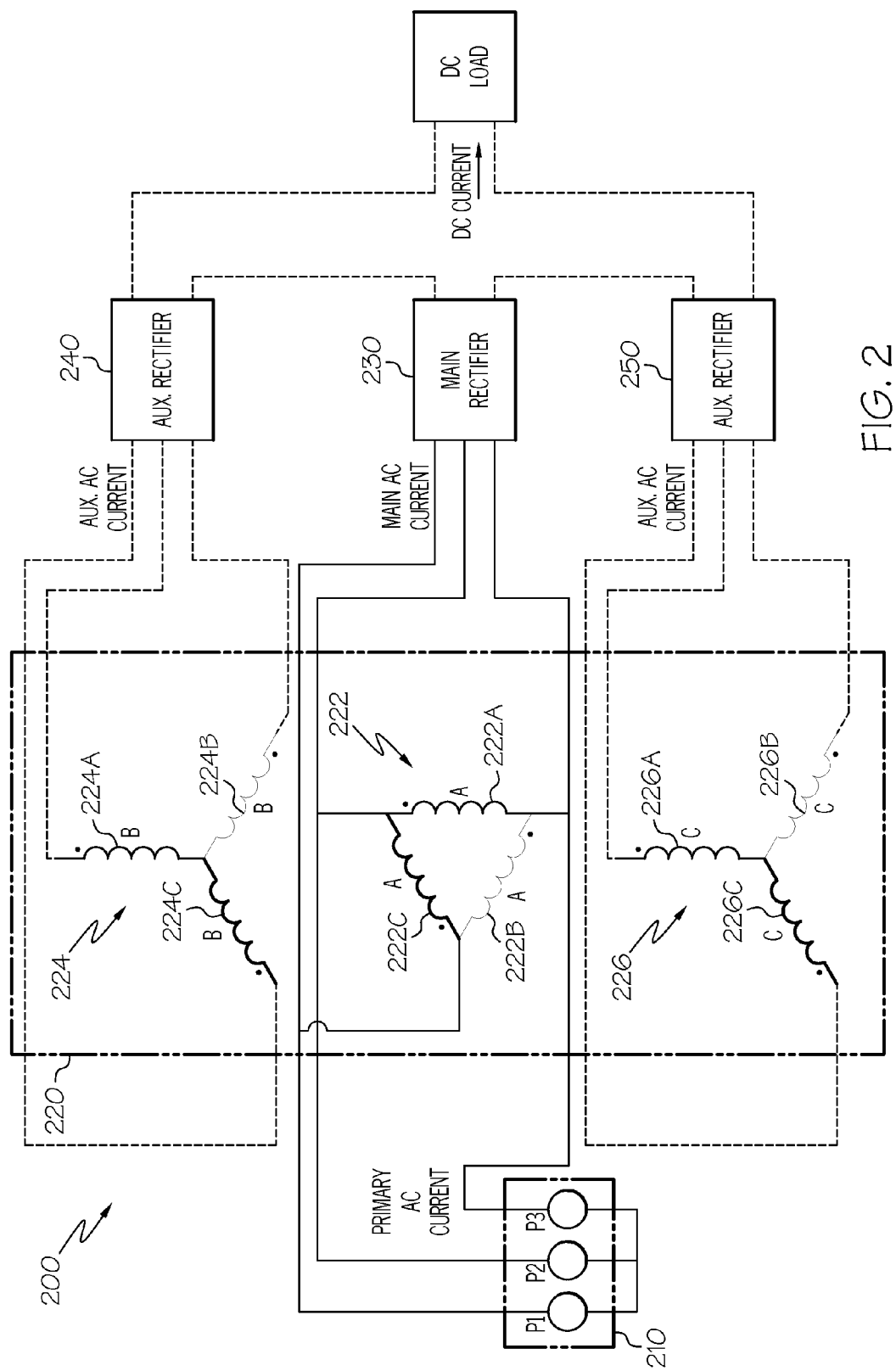
FIG. 2 is a schematic diagram of an AC-to-DC power converter in accordance with a second embodiment of the invention.

Referring now to FIG. 2, it may be seen that an exemplary AC-to-DC converter 200 may include an AC power source 210, a transformer assembly 220, a main rectifier 230, a first auxiliary rectifier 240 and a second auxiliary rectifier 250. The transformer assembly 220 may include a set of primary windings designated generally by the numeral 222 and two sets of secondary windings designated generally by the numerals 224 and 226. The primary windings are specifically designated as winding 222A, winding 222B, and winding 222C. The set of secondary windings 224 are specifically designated as winding 224A, winding 224B and winding 224C. The set of secondary windings 226 are designated specifically as winding 226A, winding 226B and winding 226C.

The primary windings 222A, 222B and 222C may be connected directly to the AC power source 210 and also to the main rectifier 230. The secondary windings 224A and 226A may be inductively coupled to the primary winding 222A. Similarly, the secondary windings 224B and 226B may be inductively coupled to the primary winding 222B and the secondary windings 224C and 226C may be inductively coupled to the primary winding 222C.

In the exemplary embodiment of the converter 200, the set of primary windings 222 may be interconnected in a DELTA configuration, the set of secondary windings 224 may be interconnected with one another in a WYE configuration and the set of secondary windings 226 may be interconnected with one another in a WYE configuration. In that regard, the set of secondary windings 224 and the set of secondary windings 226 may be in phase shifting relationships relative to the set of primary windings 222.

AC power emerging from the set of secondary windings 224 may experience a phase shift relative to power entering the primary windings 222. Similarly, AC power emerging from the set of secondary windings 226 may experience a phase shift relative to power emerging from the set of primary windings 222, with an attendant significant reduction in low-end harmonic distortion of input power.

The auxiliary rectifiers 240 and 250 may be connected in series to one another and to the main rectifier 230. Thus, output voltages of the auxiliary rectifiers 240 and 250 and the main rectifier 230 may be stacked to provide voltage boosting. In the particular arrangement of the converter 200, the converter may function in a 12 pulse mode with a converter boost ratio of about 1.0:2.0 (input to output). A W/VA ratio of about 0.887 may be attained as compared to prior art converters that may have W/VA ratio of about 0.5. Such an improvement in W/VA ratio may translate to a size and/or weight reduction of about 43.6%.

It may be noted that the converter 100 of FIG. 1 and the converter 200 of FIG. 2 may be considered symmetrical converters. Output voltages of the set of secondary windings 124 may be equal to output voltages of the set of the secondary windings 126 of the converter 100. Similarly, output voltages of the set of secondary windings 224 may be equal to output voltages of the set of the secondary windings 226 of the converter 200. In that regard, the configuration of the set of secondary windings 124 may be considered to the same as the configuration of the set of secondary windings 126, and the configuration of the set of secondary windings 224 may be considered to the same as the configuration of the set of secondary windings 226.

Figure 3:
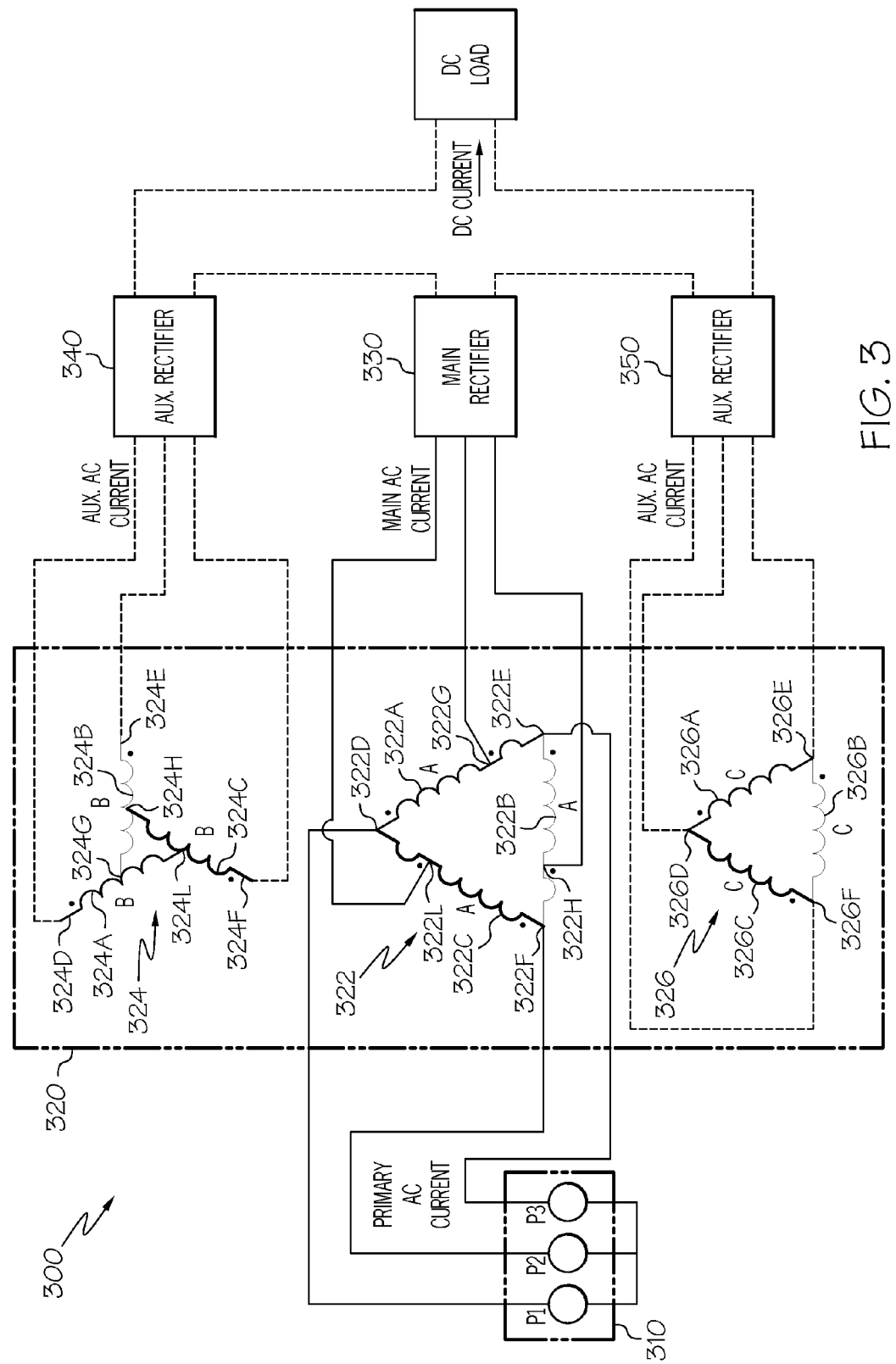
FIG. 3 is a schematic diagram of an AC-to-DC power converter in accordance with a third embodiment of the invention.

Referring now to FIG. 3, it may be seen that an exemplary non-symmetrical AC-to-DC converter 300 may include an AC power source 310, a transformer assembly 320, a main rectifier 330, a first auxiliary rectifier 340 and a second auxiliary rectifier 350. The transformer assembly 320 may include a set of primary windings designated generally by the numeral 322 and two sets of secondary windings designated generally by the numerals 324 and 326.

The set of primary windings 322 may be connected to the AC power source 310 and also to the main rectifier 330. The set of secondary windings 324 may be inductively coupled to the set of primary windings 322. Similarly, the set of secondary windings 326 may be inductively coupled to the set of primary windings 322. AC power emerging from the set of secondary windings 324 may experience a phase shift relative to power entering the set of primary windings 322. Similarly, AC power emerging from the set of secondary windings 326 may experience a phase shift relative to power entering the set of primary windings 322. In that regard, the set of secondary windings 324 and the set of secondary windings 326 may be in phase shifting relationships relative to the set of primary windings 322 with an attendant significant reduction in low-end harmonic distortion of input power.

In the exemplary embodiment of the converter 300, the set of primary windings 322 may be interconnected as three legs in a DELTA configuration. The legs are designated 322A, 322B and 322C. The set of primary windings 322 may be configured so that with each of the legs 322A, 322B and 322C may be connected to an adjacent one of the legs at leg-end terminals 322D, 322E and 322F. Each of the legs 322A, 322B and 322C may have power output terminals 322G, 322H and 322L, respectively, positioned between the leg-end terminals 322D, 322E and 322F. The power output terminals 322G, 322H and 322L may be connected to the main rectifier 330.

The first set of secondary windings 324 may include three legs, designated 324A, 324B and 324C. Each of the three legs 324A, 324B and 324C may have power-output terminals, designated 324D, 324E and 324F, respectively, and leg-interconnection terminals, designated 324G, 324H and 324L, respectively. Each of the power-output terminals 324D, 324E and 324F may be connected to the auxiliary rectifier 340. Each of the leg-interconnection terminals 324G, 324H and 324L may be connected to an adjacent one of the legs 324A, 324B and 324C at interconnection locations that may be positioned between the power-output terminals 324D, 324E and 324F and the leg-interconnection terminals 324G, 324H and 324L, respectively. In other words, each one of the legs is connected to an adjacent one of the legs at the leg-interconnection terminal positioned at the interconnection location of that adjacent leg.

The second set of secondary windings 326 may include three legs 326A, 326B and 326C. Each of the three legs 326A, 326B and 326C may have power-output terminals, designated 326D, 326E and 326F, respectively. The power-output terminals 326D, 326E and 326F may be connected to the auxiliary rectifier 350. The legs 326A, 326B and 326C may be connected to one another in a DELTA configuration.

The auxiliary rectifiers 340 and 350 may be connected in series to one another and to the main rectifier 330. Thus output voltages of the auxiliary rectifiers 340 and 350 and the main rectifier 330 may be stacked to provide voltage boosting. In the particular arrangement of the converter 300, the converter may function in an 18 pulse mode of operation with a converter boost ratio of about 1.0:1.96 (input to output). A W/VA ratio of about 0.713 may be attained as compared to prior art converters that may have W/VA ratio of about 0.5. Such an improvement in W/VA ratio may translate to a size and/or weight reduction of about 30%.

Figure 4:
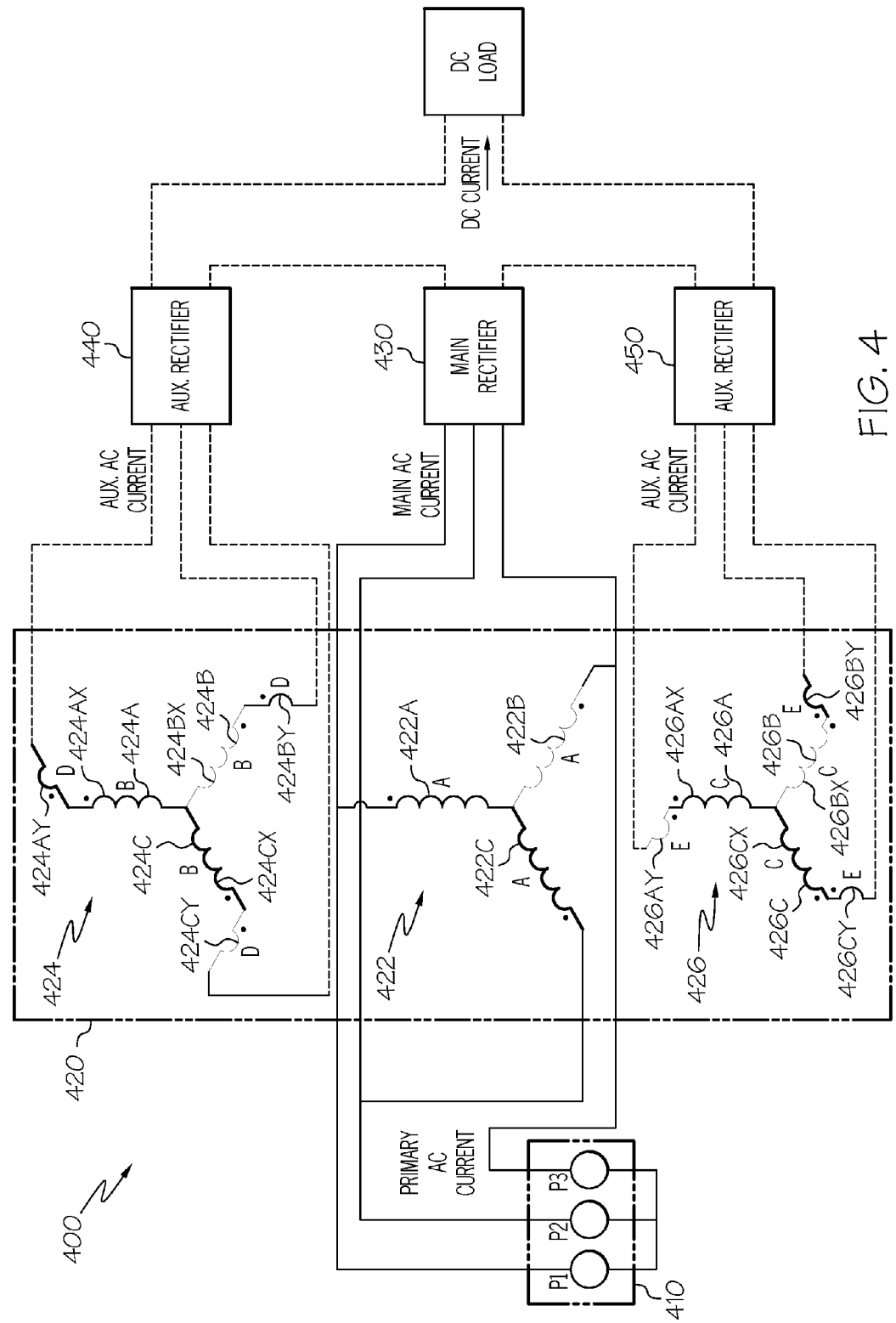
FIG. 4 is a schematic diagram of an AC-to-DC power converter in accordance with a fourth embodiment of the invention.

Referring now to FIG. 4, it may be seen that an exemplary non-symmetrical AC-to-DC converter 400 may include an AC power source 410, a transformer assembly 420, a main rectifier 430, a first auxiliary rectifier 440 and a second auxiliary rectifier 450. The transformer assembly 420 may include a set of primary windings designated generally by the numeral 422 and two sets of secondary windings designated generally by the numerals 424 and 426.

The set 422 of primary windings may be connected to the AC power source 410 and also to the main rectifier 430. The set of secondary windings 424 may be inductively coupled to the set of primary windings 422. Similarly, the set of secondary windings 426 may be inductively coupled to the set of primary windings 422. AC power emerging from the set of secondary windings 424 may experience a phase shift relative to power entering the set of primary windings 422. Similarly, AC power emerging from the set of secondary windings 426 may experience a phase shift relative to power entering the set of primary windings 422. In that regard, the set of secondary windings 424 and the set of secondary windings 426 may be in phase shifting relationships relative to the set of primary windings 422 with an attendant significant reduction in low-end harmonic distortion of input power.

In the exemplary embodiment of the converter 400, the set of primary windings 422 may be interconnected as three legs in a WYE configuration. The legs are designated 422A, 422B and 422C.

The set of secondary windings 424 may include three legs, designated 424A, 424B and 424C. Each of the legs 424A, 424B and 424C may include two windings. The leg 424A may include a first winding 424AX and a second winding 424AY. Similarly, the leg 424B may include a first winding 424BX and a second winding 424BY and the leg 424C may include a first winding 424CX and a second winding 424CY.

The winding 424AX may be inductively coupled to the leg 422A of the set of primary windings 422. The winding 424BX may be inductively coupled to the leg 422B of the set of primary windings 422. The winding 424CX may be inductively coupled to the leg 422C of the set of primary windings 422.

The winding 424AY may be inductively coupled to the leg 422C of the set of primary windings 422. The winding 424BY may be inductively coupled to the leg 422A of the set of primary windings 422. The winding 424CY may be inductively coupled to the leg 422B of the set of primary windings 422.

The windings 424AX, 424BX and 424CX may be connected to one another. The windings 424AY, 424BY and 424CY may be connected to the auxiliary rectifier 440.

The set of secondary windings 426 may include three legs, designated 426A, 426B and 426C. Each of the legs 426A, 426B and 426C may include two windings. The leg 426A may include a first winding 426AX and a second winding 426AY. Similarly, the leg 426B may include a first winding 426BX and a second winding 426BY, and the leg 426C may include a first winding 426CX and a second winding 426CY.

The winding 426AX may be inductively coupled to the leg 422A of the set of primary windings 422. The winding 426BX may be inductively coupled to the leg 422B of the set of primary windings 422. The winding 426CX may be inductively coupled to the leg 422C of the set of primary windings 422.

The winding 426AY may be inductively coupled to the leg 422B of the set of primary windings 422. The winding 426BY may be inductively coupled to the leg 422C of the set of primary windings 422. The winding 426CY may be inductively coupled to the leg 422A of the set of primary windings 422.

The windings 426AX, 426BX and 426CX may be connected to one another. The windings 426AY, 426BY and 426CY may be connected to the auxiliary rectifier 450.

The auxiliary rectifiers 440 and 450 may be connected in series to one another and to the main rectifier 430. Thus output voltages of the auxiliary rectifiers 440 and 450 and the main rectifier 430 may be stacked to provide voltage boosting. In the particular arrangement of the converter 400, the converter may function in an 18 pulse mode of operation with a converter boost ratio of about 1.0:1.96 (input to output). A W/VA ratio of about 0.713 may be attained as compared to prior art converters that may have W/VA ratio of about 0.5. Such an improvement in W/VA ratio may translate to a size and/or weight reduction of about 30%.

It may be noted that the converter 300 of FIG. 3 and the converter 400 of FIG. 4 may be considered non-symmetrical converters. Output voltages of the set of secondary windings 324 may be unequal to output voltages of the set of the secondary windings 326 of the converter 300. Similarly, output voltages of the set of secondary windings 424 may be unequal to output voltages of the set of the secondary windings 426 of the converter 400. In that regard the configuration of the set of secondary windings 324 may be considered to differ from the configuration of the set of secondary windings 326 and the configuration of the set of secondary windings 424 may be considered to differ from the configuration of the set of secondary windings 426.

Figure 5:
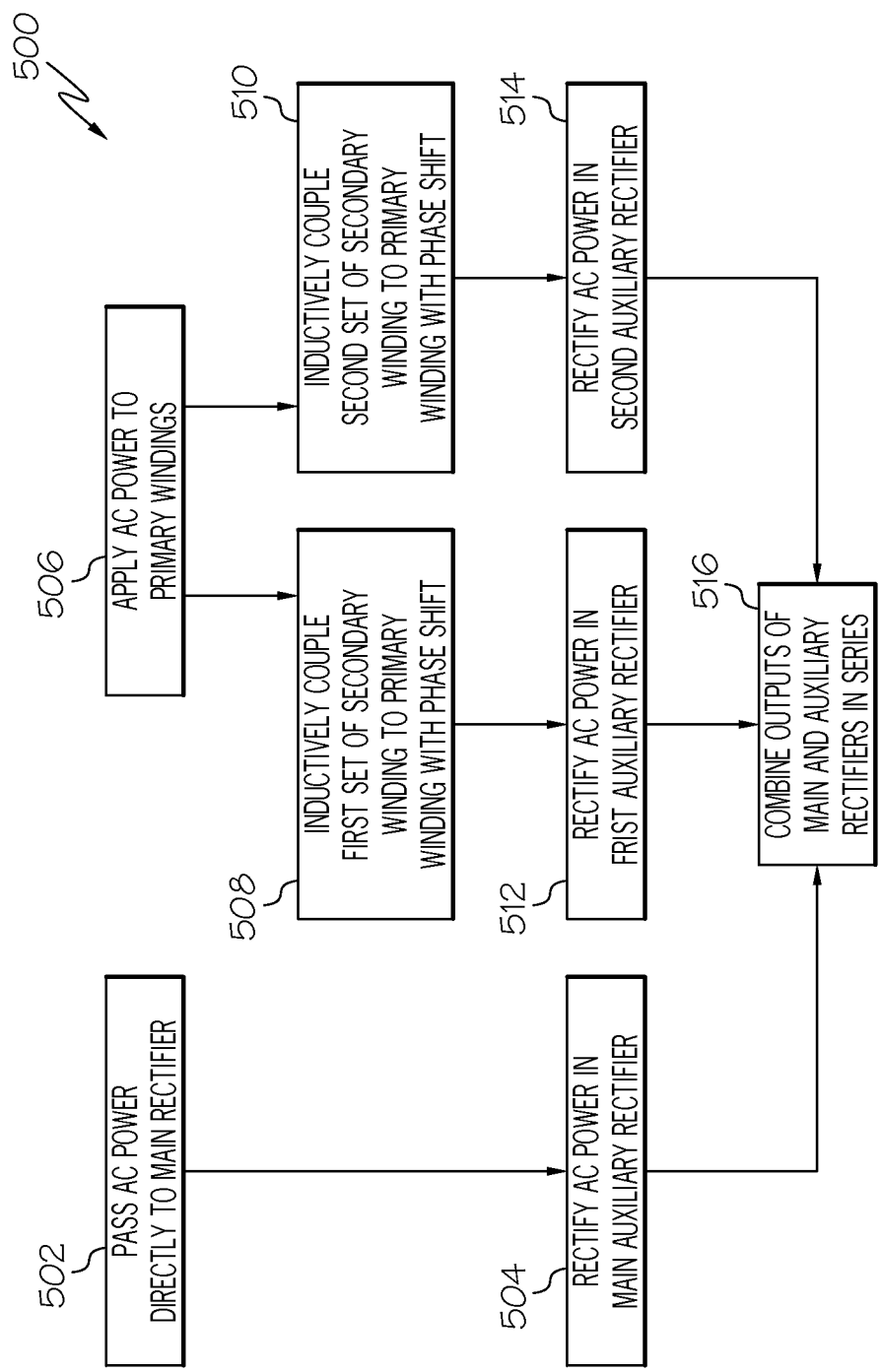
FIG. 5 is a flowchart of a method for performing AC-to-DC power conversion in accordance with an embodiment of the invention.

Referring now to FIG. 5, flowchart 500 illustrates a method for performing AC-to-DC power conversion with a voltage boost. In a step 502, a first portion of AC power may be passed directly to a main rectifier at a first voltage (e.g., power from the AC power source 110 may be passed directly to the main rectifier 130). In a step 504, the first portion of AC power may be rectified in the main rectifier. In a step 506, AC power may be applied to primary windings of a transformer at the first voltage (e.g., power from the AC power source 110 may be applied to the set of the primary windings 122 of the transformer 120). In a step 508, a first set of secondary windings of the transformer may be inductively coupled to transfer a second portion of AC power to the first set of secondary windings, said transfer being performed while introducing a phase shift of the second portion of AC power relative to the first portion of AC power (e.g., the first set of secondary windings 124 may be arranged in a DELTA configuration and the set of primary windings 122 may be arranged in a WYE configuration, thus resulting in a phase shift of the second portion of AC power that passes from the set of primary windings 122 to the set of secondary windings 124). In a step 510, the second portion of AC power may be rectified in a first auxiliary rectifier (e.g., output from the set of secondary windings 124 may be rectified in the auxiliary rectifier 140).

In a step 512, a second set of secondary windings of the transformer may be inductively coupled to transfer a third portion of AC power to the second set of secondary windings, said transfer being performed while introducing a phase shift of the third portion of AC power relative to the first portion of AC power (e.g., the second set of secondary windings 126 may be arranged in a DELTA configuration and the set of primary windings 122 may be arranged in a WYE configuration, thus resulting in a phase shift of the third portion of AC power that passes from the set of primary windings 122 to the set of secondary windings 126). In a step 514, the third portion of AC power may be rectified in a second auxiliary rectifier (e.g., output from the set of secondary windings 126 may be rectified in the auxiliary rectifier 150). In a step 516, outputs of the main and auxiliary rectifiers may be combined in series to produce a single rectified DC output.

It should be understood, of course, that the foregoing relates to exemplary embodiments of the invention and that modifications may be made without departing from the spirit and scope of the invention as set forth in the following claims.

We claim:
1. A non-symmetrical AC-to-DC converter comprising:
a main rectifier;
a first auxiliary rectifier;
a second auxiliary rectifier; and
a transformer assembly including:
   a set of primary windings arranged in a first multiphase DELTA configuration and connected to the main rectifier;
   a first set of secondary windings arranged in a second multiphase DELTA configuration and connected to the first auxiliary rectifier; and
   a second set of secondary windings arranged in a third multiphase DELTA configuration and connected to the second auxiliary rectifier;
   wherein the second multiphase DELTA configuration of the first set of secondary windings and the third multiphase DELTA configuration of the second set of secondary windings are in phase shifting relationships relative to the first multiphase DELTA configuration of the set of primary windings so that AC power emerging from the first and the second set of secondary winding is phase shifted relative to AC power applied to the set of primary windings;
   wherein the second multiphase DELTA configuration of the first set of secondary windings differs from the third multiphase DELTA configuration of the second set of secondary windings,
   wherein the set of primary windings includes three legs connected to adjacent legs at leg-end terminals;
   wherein the three legs of the primary windings have power output terminals positioned intermediately between their respective leg-end terminals; and
   wherein the power output terminals of the primary windings are connected to the main rectifier;
   wherein legs of the first set of secondary windings include two windings;
   wherein legs of the second set of secondary windings include only one winding;
wherein an AC power source, having an AC input voltage, is directly connected to the main rectifier in parallel with the set of primary windings so that output voltage of the main rectifier corresponds to rectified DC voltage of the AC input voltage, and
wherein outputs of the main rectifier and the first and second auxiliary rectifiers are connected together in series so that output voltages of the auxiliary rectifiers and the main rectifier are stacked to provide voltage boosting of DC output voltage of the converter higher than the rectified DC voltage of the AC input voltage.
2. The non-symmetrical AC-to-DC converter of claim 1 wherein:

the legs of the first set of secondary windings include a power-output terminal and a leg-interconnection terminal;

the power-output terminals are connected to the first auxiliary rectifier;

the leg-interconnection terminals are connected to adjacent ones of the three legs at interconnection locations that are positioned between the power-output terminals and the leg-interconnection terminals of said adjacent ones of the three legs.

3. The non-symmetrical AC-to-DC converter of claim 1 wherein:

the legs of the second set of secondary windings include power-output terminals;

the power-output terminals are connected to the second auxiliary rectifier; and the power-output terminals of any one of the three legs are connected to the power-output terminals of an adjacent one of the three legs.

4. A method for performing three phase AC-to-DC power conversion with a voltage boost comprising the steps of:

passing a first portion of AC power directly from an AC power source to a main rectifier at a first AC voltage;

rectifying the first portion of AC power in the main rectifier to produce DC power at a first DC voltage;

applying AC power, from the AC power source, directly to power input terminals of the primary windings of a transformer at the first AC voltage;

passing power output from the primary windings to the main rectifier from power output terminals, the power output terminals being positioned intermediately between the power input terminals;

inductively transferring a second portion of AC power from the primary windings to a first set of secondary windings of the transformer while introducing a phase shift of the second portion of AC power relative to the first portion of AC power;

passing power output from the first set of secondary windings to a first auxiliary rectifier from power output terminals, said power output terminals being connected to only one leg of the first set of secondary windings;

rectifying the second portion of AC power in the first auxiliary rectifier;

inductively transferring a third portion of AC power from the primary windings to a second set of secondary windings of the transformer while introducing a phase shift of the third portion of AC power relative to the first portion of AC power;

passing power output from the second set of secondary windings to a second auxiliary rectifier from power output terminals, said power output terminals being connected to two legs of the second set of secondary windings;

rectifying the third portion of AC power in the second auxiliary rectifier; and combining outputs of the main and auxiliary rectifiers through a series connection so that output voltage of the main and auxiliary rectifiers are added together to produce a single rectified DC output at a boosted voltage higher than the first DC voltage, wherein the primary windings and the first and second sets of secondary windings are connected in DELTA configurations.

5. The method of claim 4 wherein the three phase AC-to-DC conversion is performed in an 18 pulse mode with a voltage boost ratio of 1.0:1.96.

* * * * *